US005884208A

United States Patent [19]

Byon

[11] Patent Number: 5,884,208

[45] Date of Patent: Mar. 16, 1999

[54] METHOD FOR FAST ACCELERATING A VEHICLE AND AN APPARATUS FOR PERFORMING THE SAME

[75] Inventor: Sung-Kwang Byon, Seoul, Rep. of Korea

[73] Assignee: Daewoo Electronics Co., Ltd., Rep. of Korea

[21] Appl. No.: 688,669

[22] Filed: Jul. 29, 1996

[30] Foreign Application Priority Data

Jul. 28, 1995 [KR] Rep. of Korea .................. 1995 22710

[51] Int. Cl.[6] ...................................................... G06F 19/00

[52] U.S. Cl. ............................ 701/110; 701/70; 701/103; 477/120; 477/121; 477/183; 123/492

[58] Field of Search ..................................... 701/101, 102, 701/103, 110, 54, 70, 105; 123/492, 336; 477/111, 120, 121, 183, 905

[56] References Cited

U.S. PATENT DOCUMENTS

| | | | |
|---|---|---|---|
| 4,310,889 | 1/1982 | Imai et al. | 701/102 |
| 4,787,044 | 11/1988 | Nagata et al. | 701/110 |
| 4,796,579 | 1/1989 | Wolfe et al. | 123/336 |
| 4,870,934 | 10/1989 | Vanetta et al. | 123/336 |
| 4,892,071 | 1/1990 | Asayama | 123/336 |
| 4,905,530 | 3/1990 | Stehle et al. | 74/335 |
| 5,496,230 | 3/1996 | Ando et al. | 477/111 |

*Primary Examiner*—William A. Cuchlinski, Jr.
*Assistant Examiner*—Gertrude Arthur
*Attorney, Agent, or Firm*—Pennie & Edmonds LLP

[57] ABSTRACT

An apparatus and a method for fast accelerating a vehicle which converts to a fast acceleration mode, wide-opens a throttle valve, increases the torque of a transmission, locks up a transmission after gearshifting a transmission to a high gear position if the torque of the transmission reaches a predetermined value, and converts from a fast acceleration mode to a normal acceleration mode if a brake pedal is depressed. In the fast acceleration mode, a fuel-air mixture is injected into the engine asynchronously and the throttle valve is wide-opened. A vehicle can be accelerated quickly by just a narrow depression of an accelerator pedal. The apparatus comprises a mode switch, an accelerator pedal sensor, a first control unit for controlling a vehicle under a normal acceleration mode, a motor for wide-opening the throttle valve, and a second control unit for controlling a vehicle under a fast acceleration mode.

4 Claims, 5 Drawing Sheets

METHOD FOR FAST ACCELERATING A VEHICLE AND AN APPARATUS FOR PERFORMING THE SAME

BACKGROUND OF THE INVENTION

1. Field of the Invention

The present invention relates to an accelerating method of a vehicle and a method for performing the same, and more particularly to a method for accelerating a vehicle quickly and easily, and an apparatus for accomplishing the method.

2. Description of the Prior Art

An accelerating apparatus is generally provided in all kinds of vehicles. An accelerating apparatus is used to accelerate a vehicle when a driver wants to drive faster or wants to pass another preceding vehicle ahead. FIG. 1 shows a conventional accelerating apparatus 10 of a vehicle. With reference to FIG. 1, accelerating apparatus 10 includes a throttle valve 20 which is provided in an engine intake-manifold 40 and regulates the amount of a fuel-air mixture that is introduced into an engine (not shown), and an accelerator pedal 30 which is mechanically connected to throttle body 20 by a cable 50 and is handled by a driver. Throttle valve 20 operates according to the depression of accelerator pedal 30 by a driver. The deeper accelerator pedal 30 is depressed, the wider throttle valve 20 is opened. As throttle valve 20 is opened wider, the amount of a fuel-air mixture that is introduced into the engine increases. Therefore, the revolution per minute (RPM) of the engine also increases, so the vehicle is accelerated. On the other hand, the less that accelerator pedal 30 is depressed, the narrower that throttle valve 20 opens. As throttle valve 20 opens less, the amount of fuel-air mixture that is introduced into the engine decreases. Accordingly, the RPM of the engine decreases so that the speed of the vehicle is reduced. However, the accelerating apparatus has poor accelerative response.

An accelerating device of a vehicle for improving accelerative response is disclosed U.S. Pat. No. 4,796,579 (issued to Brian C. Wolfe, et. al. on Jan. 10, 1989).

The accelerating device of Brian et al. is shown in FIGS. 2 and 3. A throttle body 100 of Brian's accelerating device includes a main annular air induction passage 110, a primary passage 112 branched from main annular air induction passage 110, a secondary passage 140 also branched from main annular air induction passage 110 and parallel to passage 112, a conical-like pintle 114 which is slidably mounted within primary passage 112 and which varies the cross-sectional air flow area, a pintle position sensor 120 for detecting the position of pintle 114, and an electrical actuator/motor 130 electrically connected to an upper end 116 of pintle 114 and also electrically connected to a microprocessor (not shown) so that electrical actuator/motor 130 varies the vertical position of pintle 114 according to the control of the microprocessor.

A butterfly type throttle valve 142 is rotatably mounted within secondary passage 140. Butterfly type throttle valve 142 is spring-biased to be placed at a closing position of throttle valve 142 and moves to a near vertical wide-open throttle position from the closing position. The movement of butterfly type throttle valve 142 is accomplished mechanically by a direct mechanical connection to accelerator pedal 150. Secondary passage 140 is normally closed, and is opened only when accelerator pedal 150 is deeply depressed, so that the throttle valve is nearly or fully in a wide-open position when additional air flow to the engine is needed.

Only primary passage 110 is operated during the normal acceleration, as secondary passage 140 is fully closed. Secondary passage 140 is used only when additional air flow is needed. Namely, secondary passage 140 is operated only when accelerator pedal 150 is depressed so that the throttle valve is nearly or fully in a wide-open position. At a nearly or fully wide-open position, secondary passage 140 as well as primary passage 110 is opened, so additional air flow can be supplied into the engine.

Secondary passage 140 can also be used to supply enough air flow to sustain engine operation if primary passage 10 becomes inoperative because of an the inoperativeness of a part of the vehicle's electrical system such as actuator 130 of the like. Secondary passage 140 is operated by the movement of butterfly type throttle valve 142 mechanically connected to accelerator pedal 150.

Nevertheless, in the above-mentioned throttle body, the secondary passage is opened only when the accelerator is deeply depressed so that the throttle valve is in a nearly or fully wide-open position. Therefore, the throttle body has poor accelerative responsibility, and the accelerator pedal must be deeply depressed continuously for fast acceleration.

SUMMARY OF THE INVENTION

Therefore, it is a first object of the present invention to provide a method which can accelerate a vehicle quickly and easily without deeply depressing its accelerator pedal continuously.

It is a second object of the present invention to provide a apparatus which can accelerate a vehicle quickly and easily without deeply depressing its accelerator pedal continuously.

In order to achieve the first object of the present invention, there is provided a method for fast acceleration of a vehicle comprising the steps of: a) converting from a normal acceleration mode of the vehicle into a fast acceleration mode; b) reading an interrupt data during conversion into the fast acceleration mode; c) controlling an engine of the vehicle to wide open a throttle valve of the engine in response to the interrupt data; d) controlling a transmission of the vehicle so as to obtain a predetermined output and velocity; and e) converting from the fast acceleration mode back to a normal acceleration mode.

The step a) may be performed by i) detecting the depression of the accelerator pedal when a conversion switch is closed, and then generating a fast acceleration mode signal, and ii) receiving the fast acceleration mode signal, and then generating a first interrupt signal. Due to the first interrupt signal, the normal control of an engine and a transmission is stopped, and the engine and the transmission are controlled under the fast acceleration mode. The interrupt data is read out from the fast interrupt signal, and the throttle valve is widely opened. The interrupt data includes data of the throttle valve's position (the opened angle of the throttle valve), and the output and velocity ratio of the vehicle's transmission.

The step c) may be performed by i) wide-opening the throttle valve according to the interrupt data, and ii) injecting a fuel-air mixture into the engine asynchronously.

The step d) may be performed by i) gearshifting the transmission to a low gear position so as to obtain a predetermined output, ii) detecting an output of transmission, and gearshifting the transmission to a high gear position if the output of transmission is above a predetermined value, and iii) locking up the transmission after gearshifting the transmission to a high gear position.

The step e) may be performed by i) generating a second interrupt signal if the mode switch is opened or the brake pedal is depressed, and ii) converting the fast acceleration mode into the normal acceleration mode after receiving the second interrupt signal. If the engine and the transmission receive the second interrupt signal, they are controlled in accordance with the data sent by a map sensor and an RPM sensor.

In order to achieve the second object of the present invention, there is provided an apparatus for quickly accelerating a vehicle, which comprises: a) a mode switch for converting an acceleration mode of a vehicle; b) an accelerator pedal sensor attached to an accelerator pedal, for generating a pedal signal if the accelerator pedal is depressed; c) a first control unit electrically connected both to the mode switch and to the accelerator pedal sensor, for accomplishing the normal acceleration mode and for generating a first interrupt signal if the mode switch is closed and if it receives the accelerator pedal signal, d) a brake sensor attached to a brake pedal for generating a brake signal if the brake pedal is depressed, and e) a fast acceleration mode unit, for accomplishing a fast acceleration mode if it receives the first interrupt signal, and for sending the second interrupt signal to the first control unit so as to convert to the normal acceleration mode if the mode switch is opened and if the first control unit receives the brake signal.

The first control unit controls the normal acceleration mode of a vehicle. Namely, when he mode switch is open, a vehicle is accelerated, and the engine and the transmission of the vehicle are controlled by a conventional method. However, if the mode switch is closed and the accelerator pedal is depressed, the mode switch is closed, the vehicle is convened into a fast acceleration mode, and the vehicle is controlled by the fast acceleration mode unit.

The fast acceleration mode unit may have (i) a motor for opening the throttle valve, (ii) a memory for storing the interrupt data read from the first interrupt signal, (iii) a transmission for changing the velocity ratio, (iv) a torque sensor attached to the transmission, for detecting the torque of the transmission, and (v) a second control unit for controlling injectors injecting fuel-air mixture into the engine.

If the second control unit receives the first interrupt signal, it controls the motor, thus wide-opens the throttle valve. At the same time, the second control unit make the injectors inject fuel-air mixture into the engine, regardless of the crank angle of the engine. Therefore, the amount of the fuel-air mixture introduced into the engine increases, thereby creasing the RPM of the engine.

The second control unit controls the transmission so as to gearshift it to a low gear position, so that the torque of the transmission becomes a predetermined valve. If the torque of the transmission reaches the predetermined value, the second control unit gearshifts to a higher-speed, and locks up the transmission.

If the brake signal is received from the brake sensor or the mode switch is opened, the second control unit generates the second interrupt signal, so that the first control unit controls the engine under the normal acceleration mode.

According to the present invention, a vehicle can be accelerated quickly and easily and can also be accelerated on an up-hill road or the like efficiently, without the continuous depression of the accelerator pedal.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
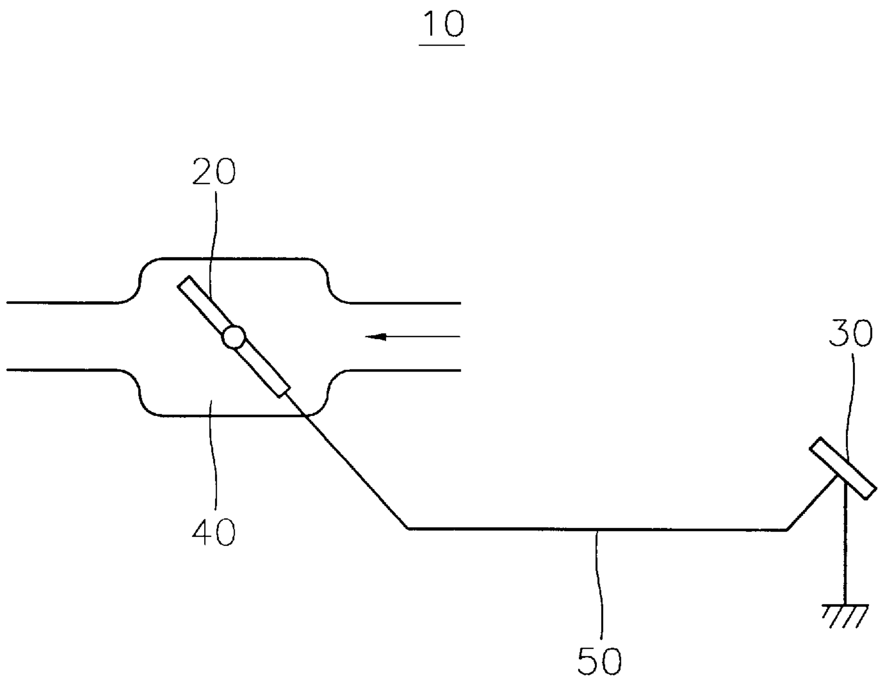
FIG. 1 (PRIOR ART)
FIG. 1 shows a conventional accelerating apparatus of a vehicle.
Figure 2:
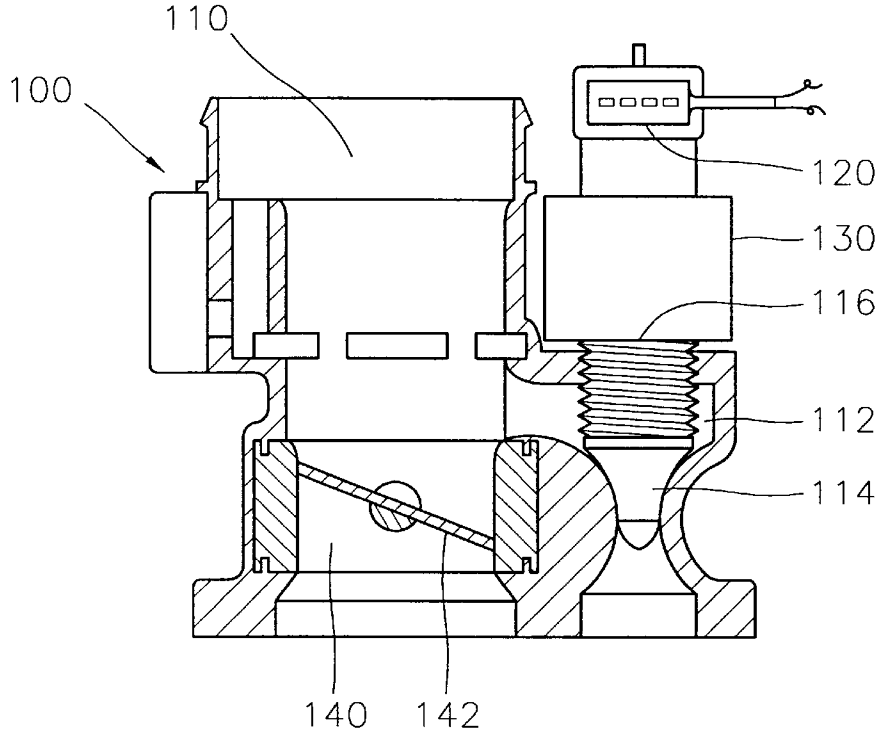
FIG. 2 (PRIOR ART)
FIG. 2 is a cross sectional view for showing a conventional throttle body.
Figure 3:
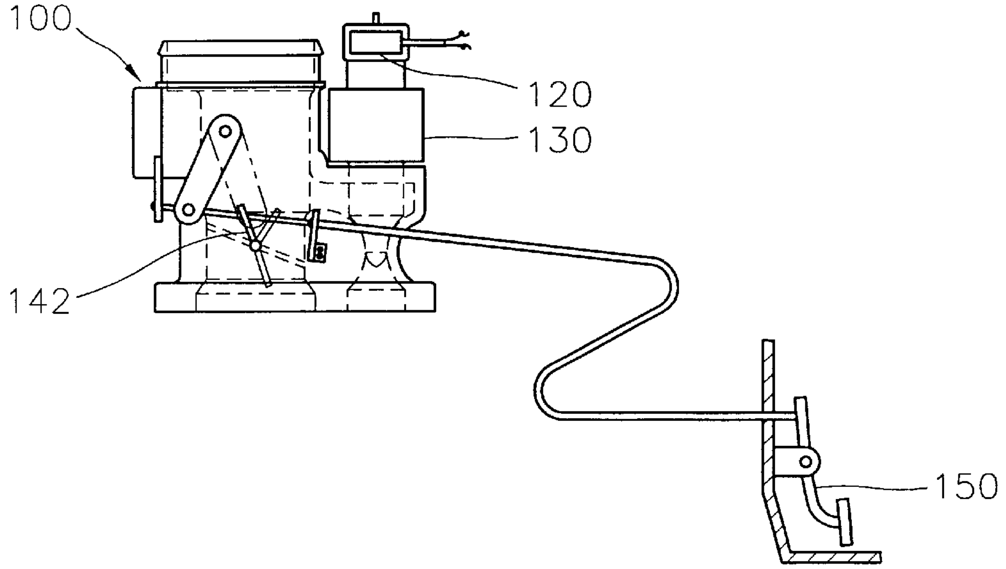
FIG. 3 (PRIOR ART)
FIG. 3 is an explanatory view for explaining the opening operation of the secondary passage of the throttle body of FIG. 2.
Figure 4:
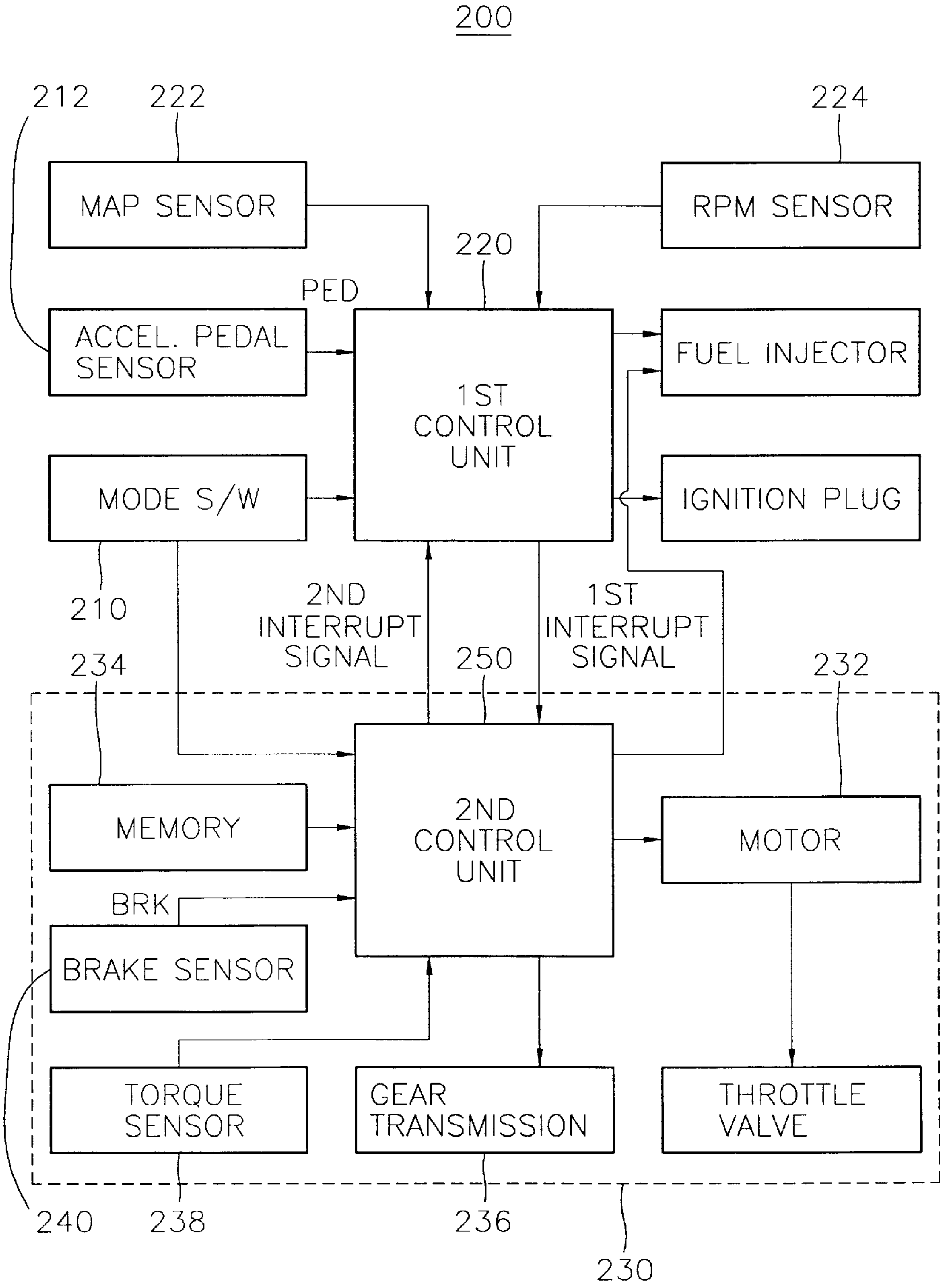
FIG. 4 is a block diagram for explaining a fast acceleration apparatus according to one embodiment of the present invention.

As shown in FIG. 4, an fast acceleration apparatus 200 according to an embodiment of the present invention has a mode switch 210 for changing the acceleration mode of the vehicle, an accelerator pedal sensor 212 for sending a pedal signal PED if the accelerator pedal is depressed, and a first control unit 220 for sending a first interrupt signal INT1 if the mode switch is closed and the pedal signal PED is received.

First control unit 220 controls an engine (not shown) of a vehicle under a normal acceleration mode by the data received from a map sensor 222, an RPM sensor 224, or the like. In the normal acceleration, the injection of a fuel-air mixture which is introduced into the engine is accomplished either by a sequential injection or by a simultaneous injection in accordance with the crank angle. However, if mode switch 210 is closed and the pedal signal PED is received from accelerator sensor 212, first control unit 220 sends the first interrupt signal INT1 and stops a normal acceleration mode.

First control unit 220 is electrically connected to a fast acceleration mode unit 230 which accomplishes a fast acceleration mode. First interrupt signal INT1 which is received from first cool unit 220 is transferred to a fast acceleration mode unit 230.

Fast acceleration mode unit 230 is attached to a brake pedal (not shown), and is electrically coupled to a brake sensor 240 which sends a brake signal BRK if the brake pedal is depressed, and is electrically also coupled to mode switch 210.

Fast acceleration mode unit 230 receives the brake signal BRK from brake sensor 240 and determines whether or not n mode switch 210 is opened. If the brake signal BRK is received from brake sensor 240 or if mode switch 210 is opened, fast acceleration mode unit 230 sends a second interrupt signal INT2 and stops a fast acceleration model. At the time, first control unit 220 receives second interrupt signal INT2, and controls the engine under a normal acceleration mode.

Fast acceleration mode unit 230 comprises a motor 232 for opening a throttle valve, a memory 234 for storing an interrupt data read when receiving the first interrupt signal INT1, a transmission 236 for changing the RPM of the engine in order to transmit a driving force to the wheels, a torque sensor 238 attached to transmission 236, for detecting the torque of transmission 236, and a second control unit 250 for receiving first interrupt signal INT1 to control motor 232, transmission 236, and injectors injecting a fuel-air mixture into the engine.

If second control unit 250 receives the first interrupt signal INT1 from first control unit 220, it drives motor 232 to widely open the throttle valve, and controls the injectors. Second control unit 250 controls the injectors so that a fuel-air mixture is injected into the engine asynchronously by the injectors. A fuel-air mixture is asynchronously injected into the engine regardless of the crank angle.

Further, second control unit 250 gearshifts transmission 236 to a low gear position and compares with a predetermined value the torque of transmission 236 which is detected by torque sensor 238. When the torque of transmission 236 reaches a predetermined value, second control unit 250 gearshifts transmission 236 to a high gear position and locks up the control of transmission 236.

If the brake signal BRK is received from brake sensor 240 or if mode switch 210 is opened during the fast acceleration of a vehicle by fast acceleration mode unit 230, the second interrupt signal INT2 is generated by fast acceleration mode unit 230, so the fast acceleration mode is stopped.

First control unit 220 receives the second interrupt signal INT2, and converts the fast acceleration mode back to the normal acceleration mode.

Hereinafter, a method for fast acceleration by a fast acceleration apparatus 200 of a vehicle according to a preferred embodiment of the present invention will be described in detail with reference to the accompanying drawings.

Figure 5A:
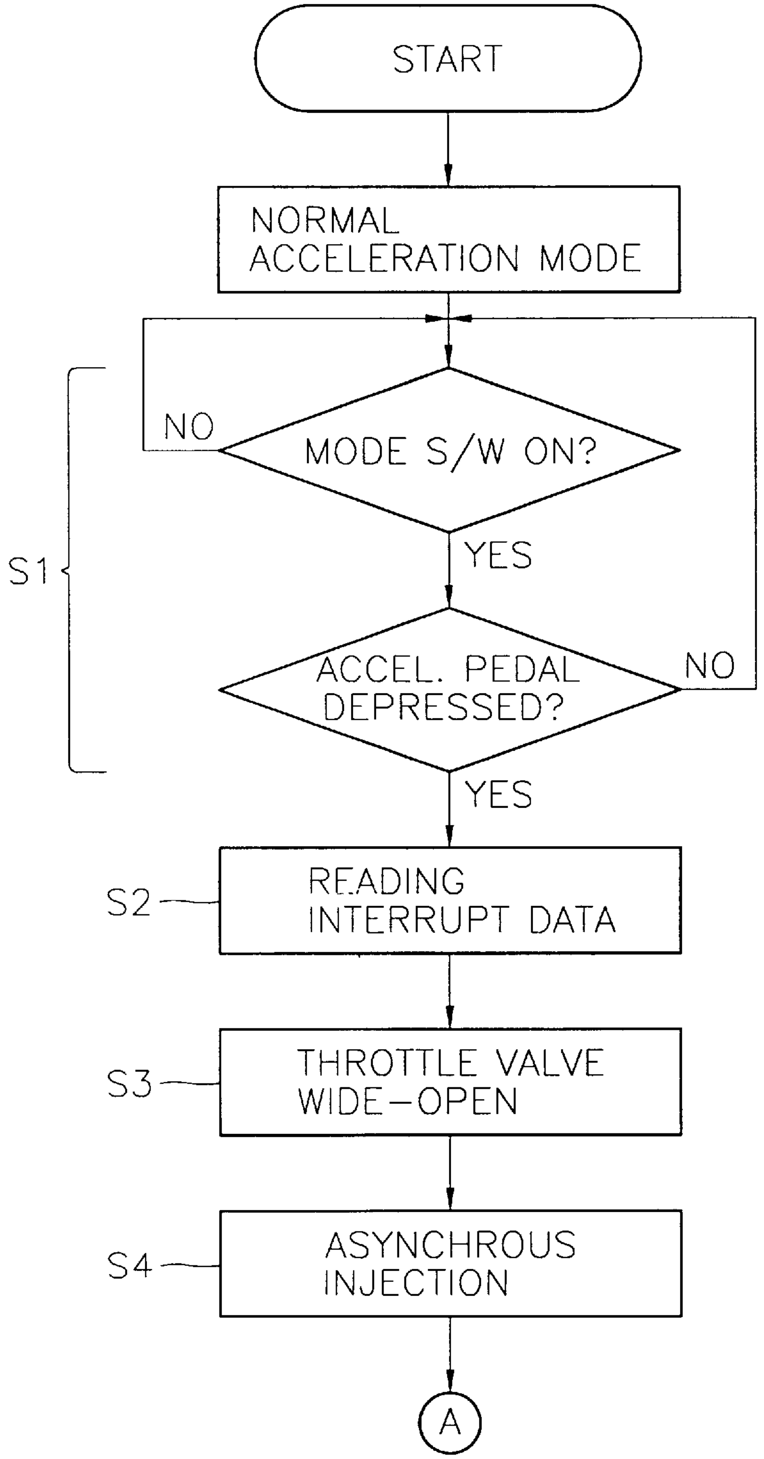
FIGS. 5A and 5B are a flow charts for explaining a fast acceleration method according to one embodiment of the present invention.
Figure 5B:
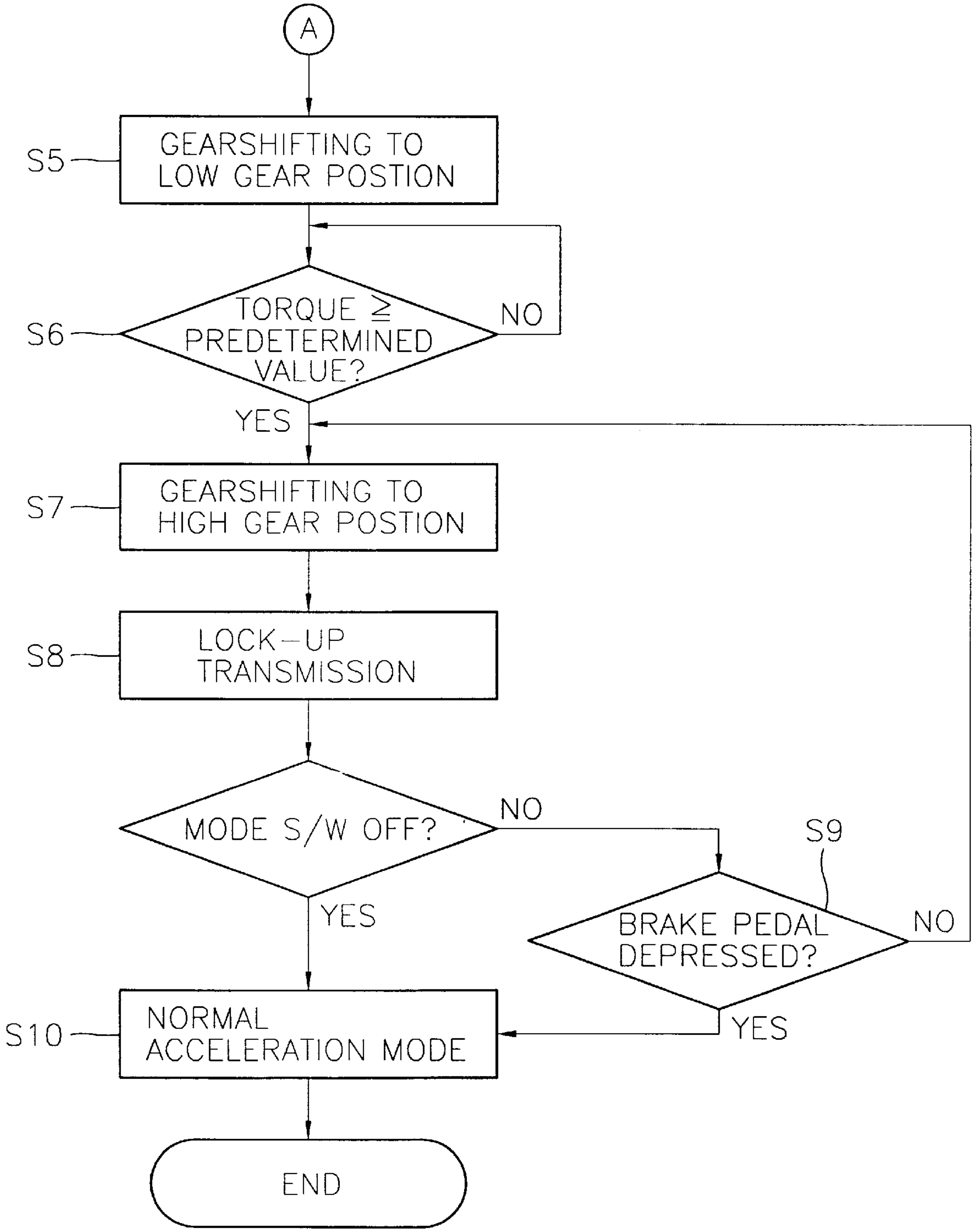

FIGS. 5A and 5B are a flow chart for explaining the fast acceleration method according to the preferred embodiment of the present invention.

As shown in FIGS. 5A and 5B, if mode switch 210 is closed and the pedal signal PED is received, first control unit 220 generates the first interrupt signal INT1 and converts a normal acceleration mode to a fast acceleration mode (Step S1).

At this time, second control unit 250 reads the interrupt data from memory 234 (Step S2). By the interrupt data, second control unit 250 drives motor 232, which wideopens the throttle (Step S3). Thereafter, second control unit 250 controls the injectors so that a fuel-air mixture is injected asynchronously into the engine by the injectors (Step S4). After a fuel-air mixture is injected asynchronously into the engine, second control unit 250 gearshift transmission 236 to a low gear position to obtain a torque high enough to accelerate the vehicle sufficiently (Step S5).

Second control unit 250 compares with a predetermined value the torque of transmission 236, which is detected by torque sensor 238 attached to transmission 236 (Step S6). If the torque of transmission 236 is greater than a predetermined value, second control unit 250 gearshifts transmission 236 to a high gear position (Step S7). Then, second control unit locks up transmission 236 (Step S8).

As described above, a vehicle can be accelerated easily by gearshifting transmission 236 to a low gear position so as to obtain a torque greater than a predetermined value. The vehicle is accelerated by the gearshifting of transmission 236 to a high gear position after the torque of transmission 236 is increased. At this time, transmission 236 is locked up, and the loss of power is prevented.

In order to convert the fast acceleration mode of the vehicle into a normal acceleration mode, mode switch 210 must be opened or the brake signal BRK must be received from brake sensor 240. Namely, if brake signal BRK is received from brake sensor 240 (i.e., if the brake pedal is depressed) or if mode switch 210 is opened during the fast acceleration of a vehicle by fast acceleration mode unit 230, second interrupt signal INT2 is generated by second control unit 250, and the fast acceleration mode is stopped (Step S9). First control unit 220 receives the second interrupt signal INT2, and controls the engine to convert to the normal acceleration mode (Step S10).

According to the present invention, a driver may not depress the accelerator pedal in order to get a fast acceleration and the driver can accelerate a vehicle quickly and easily.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for fast accelerating a vehicle, said apparatus comprising:

- an accelerator sensor attached to an accelerator pedal, for generating a pedal signal if an accelerator pedal is depressed;
- a first control unit for accomplishing a normal acceleration mode, and for generating a first interrupt signal if a mode switch is closed and the pedal signal is received;
- a brake sensor attached to a brake pedal, for generating a brake signal if the brake pedal is depressed; and
- a means for converting to a fast acceleration mode if the first interrupt signal is received, and for sending a second interrupt signal to the first control unit so as to accomplish the normal acceleration mode if the mode switch is opened or the brake signal is received.

2. An apparatus according to claim 1 wherein the means for converting to a fast acceleration mode comprises a motor for wide-opening a throttle valve; a memory for storing the interrupt data read from the first interrupt signal, a transmission for changing the velocity ratio, a torque sensor attached to the transmission for detecting a torque of the transmission, and a second control unit for controlling injectors injecting fuel-air mixture into the engine, and for generating a second interrupt signal if the mode switch is open or if the brake signal is received.

3. An apparatus according to claim 2, wherein the second control unit accomplishes an algorithm comprising the steps of (i) controlling the motor so as to wideopen the throttle valve, (ii) injecting, a fuel-air mixture asynchronously into the engine, (iii) gearshifting the transmission to a low gear position, (iv) receiving the torque value of the transmission from the torque sensor, (v) comparing the torque value with a predetermined value, (vi) gearshifting the transmission to a high gear position if the torque value is greater than the predetermined value, (vii) locking up the transmission, and (viii) generating the second interrupt signal if the mode switch is opened or if the brake signal is received.

4. An apparatus for fast accelerating a vehicle, said apparatus comprising:

- an accelerator sensor attached to an accelerator pedal, for generating a pedal signal if the accelerator pedal is depressed;
- a first control un it for accomplishing a normal acceleration mode, and for generating a first interrupt signal if a mode switch is closed and the pedal signal is received;

a brake sensor attached to a brake pedal, for generating a brake signal if the brake pedal is depressed;

a motor for wide-opening a throttle valve;

a memory for storing the interrupt data read from the first interrupt signal;

a transmission for changing a velocity ratio;

a torque sensor attached to the transmission, for detecting a torque of the transmission; and a second control unit for controlling the motor so as to wide-open the throttle valve, for injecting a fuel-air mixture asynchronously into the engine, for gearshifting the transmission to a low gear position, for receiving a torque value of the transmission from the torque sensor, for comparing a torque value with a predetermined value, for gearshifting to transmission to a high gear position if the torque value is greater than the predetermined value, for locking up the transmission, and for generating the second interrupt signal if the mode switch is opened or if the brake signal is received.

* * * * *